(12) United States Patent
Itoh et al.

(10) Patent No.: US 12,214,709 B2
(45) Date of Patent: Feb. 4, 2025

(54) VEHICLE TRANSPORT PLANNING DEVICE, MANAGEMENT SERVER, AND VEHICLE TRANSPORT DEVICE

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP); Yuta Maniwa, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 239 days.

(21) Appl. No.: 18/053,762

(22) Filed: Nov. 9, 2022

(65) Prior Publication Data

US 2023/0219480 A1 Jul. 13, 2023

(30) Foreign Application Priority Data

Jan. 12, 2022 (JP) .................... 2022-003219

(51) Int. Cl.
*B60P 3/07* (2006.01)
*B60W 60/00* (2020.01)

(52) U.S. Cl.
CPC ............ *B60P 3/07* (2013.01); *B60W 60/0025* (2020.02); *B60W 2510/244* (2013.01); *B60W 2555/00* (2020.02); *B60W 2556/45* (2020.02)

(58) Field of Classification Search
CPC .... G06Q 10/08; G06Q 10/0835; G06Q 30/02; E04H 6/182; G08G 1/00; B60P 1/5428; B60P 3/07; G05D 1/0061; G05D 1/0055; B61L 27/16; A47J 37/0786; G05B 19/4189; B60W 60/00
See application file for complete search history.

(56) References Cited

U.S. PATENT DOCUMENTS

| 3,599,811 | A | * | 8/1971 | Watkins | ................ | B60P 1/5428 |
|---|---|---|---|---|---|---|
| | | | | | | 414/430 |
| 10,108,185 | B1 | * | 10/2018 | Theobald | ........... | G05B 19/4189 |
| 10,590,669 | B2 | * | 3/2020 | Boussard | ................ | E04H 6/182 |
| 2008/0098902 | A1 | * | 5/2008 | Mansfield | ........... | A47J 37/0786 |
| | | | | | | 99/341 |
| 2013/0297387 | A1 | * | 11/2013 | Michael | ................ | G06Q 30/02 |
| | | | | | | 705/13 |

(Continued)

FOREIGN PATENT DOCUMENTS

| JP | H899510 A | 4/1996 |
|---|---|---|
| JP | 2000-180195 A | 6/2000 |

(Continued)

*Primary Examiner* — Yuri Kan
(74) *Attorney, Agent, or Firm* — HAUPTMAN HAM, LLP

(57) ABSTRACT

A vehicle transport planning device includes a transport proposal unit that proposes, to an occupant of a vehicle equipped with an internal combustion engine, transport of the vehicle in a predetermined area where driving of the internal combustion engine is prohibited or restricted, and a transport arrangement unit that requests arrangement of a vehicle transport device for transporting the vehicle when the occupant desires the transport of the vehicle.

12 Claims, 10 Drawing Sheets

(56) References Cited

U.S. PATENT DOCUMENTS

| | | | |
|---|---|---|---|
| 2016/0115702 A1* | 4/2016 | Nordbruch | G05D 1/0055 414/231 |
| 2017/0144681 A1* | 5/2017 | Harasaki | B61L 27/16 |
| 2017/0235307 A1* | 8/2017 | Asakura | G05D 1/0061 701/23 |
| 2022/0036310 A1* | 2/2022 | Heinla | G06Q 10/08 |
| 2022/0215337 A1* | 7/2022 | Li | G06Q 10/0835 |
| 2022/0410894 A1* | 12/2022 | Foster | G06V 20/588 |
| 2023/0099582 A1* | 3/2023 | Sakai | G08G 1/00 701/400 |

FOREIGN PATENT DOCUMENTS

| | | |
|---|---|---|
| JP | 2001-101577 A | 4/2001 |
| JP | 2008-280030 A | 11/2008 |
| JP | 2018204373 A | 12/2018 |
| JP | 2020104755 A | 7/2020 |

\* cited by examiner

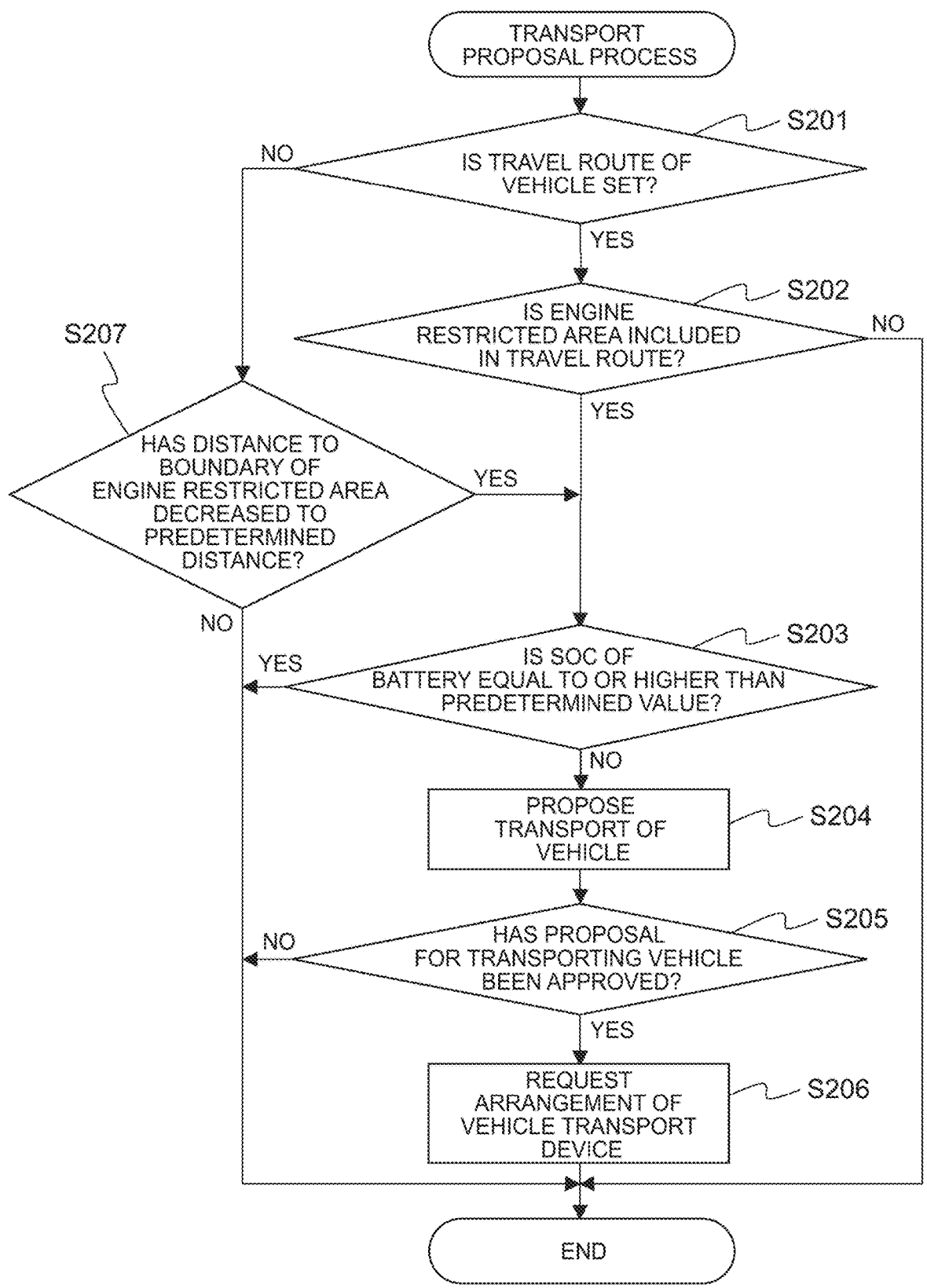

VEHICLE TRANSPORT PLANNING DEVICE, MANAGEMENT SERVER, AND VEHICLE TRANSPORT DEVICE

CROSS-REFERENCE TO RELATED APPLICATION

This application claims priority to Japanese Patent Application No. 2022-003219 filed on Jan. 12, 2022, incorporated herein by reference in its entirety.

BACKGROUND

1. Technical Field

The present disclosure relates to a vehicle transport planning device, a management server, and a vehicle transport device.

2. Description of Related Art

In recent years, in order to reduce air pollution, an engine restricted area has been set where driving of an internal combustion engine mounted on a vehicle is prohibited or restricted in a place such as an urban area with heavy traffic. Japanese Unexamined Patent Application Publication No. 2020-104755 (JP 2020-104755 A) describes that when a plug-in hybrid electric vehicle travels in an engine restricted area, an internal combustion engine is stopped and power for traveling is output only by an electric motor.

SUMMARY

However, when a state of charge (SOC) of a battery that supplies electric power to the electric motor is insufficient, it becomes difficult for the plug-in hybrid electric vehicle to travel in the engine restricted area. Further, when a destination is set in the engine restricted area, it is strongly desired that the vehicle move in the engine restricted area even when the vehicle is equipped with only the internal combustion engine as a drive source.

Accordingly, an object of the present disclosure is to enable the vehicle equipped with the internal combustion engine to move in a predetermined area where driving of the internal combustion engine is prohibited or restricted.

The gist of the present disclosure is as follows.

(1) A vehicle transport planning device including: a transport proposal unit that proposes, to an occupant of a vehicle equipped with an internal combustion engine, transport of the vehicle in a predetermined area where driving of the internal combustion engine is prohibited or restricted; and a transport arrangement unit that requests arrangement of a vehicle transport device for transporting the vehicle when the occupant desires the transport the vehicle.

(2) The vehicle transport planning device according to (1), in which the transport proposal unit determines whether to propose the transport of the vehicle based on a travel route of the vehicle, the travel route being preset in the vehicle.

(3) The vehicle transport planning device according to (1) or (2), in which the transport proposal unit proposes the transport of the vehicle when a distance from a current position of the vehicle to a boundary of the predetermined area has decreased to a predetermined distance.

(4) The vehicle transport planning device according to (1) or (2), in which the transport proposal unit proposes the transport of the vehicle when the vehicle passes through a predetermined position around the predetermined area.

(5) The vehicle transport planning device according to any one of (1) to (4), in which the vehicle is a plug-in hybrid electric vehicle equipped with a battery that is able to be charged by external power supply; and the transport proposal unit determines whether to propose the transport of the vehicle based on a state of charge of the battery.

(6) The vehicle transport planning device according to any one of (1) to (5), in which the transport arrangement unit transmits preference information of the occupant regarding travel of the vehicle transport device to a management server that manages the transport of the vehicle, when arrangement of the vehicle transport device is requested.

(7) A management server that instructs transport of a vehicle equipped with an internal combustion engine to a vehicle transport device when an occupant of the vehicle desires the transport of the vehicle in a predetermined area where driving of the internal combustion engine is prohibited or restricted.

(8) A vehicle transport device configured to transport a vehicle equipped with an internal combustion engine by autonomous travel in a predetermined area where driving of the internal combustion engine is prohibited or restricted when an occupant of the vehicle desires transport of the vehicle in the predetermined area.

According to the present disclosure, it is possible to move the vehicle equipped with the internal combustion engine in the predetermined area where driving of the internal combustion engine is prohibited or restricted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a flowchart showing a control routine for a transport proposal process in the second embodiment.

DETAILED DESCRIPTION OF EMBODIMENTS

Hereinafter, an embodiment of the present disclosure will be described below with reference to the drawings. In the following description, similar components are given the same reference numbers.

First Embodiment

Figure 1:
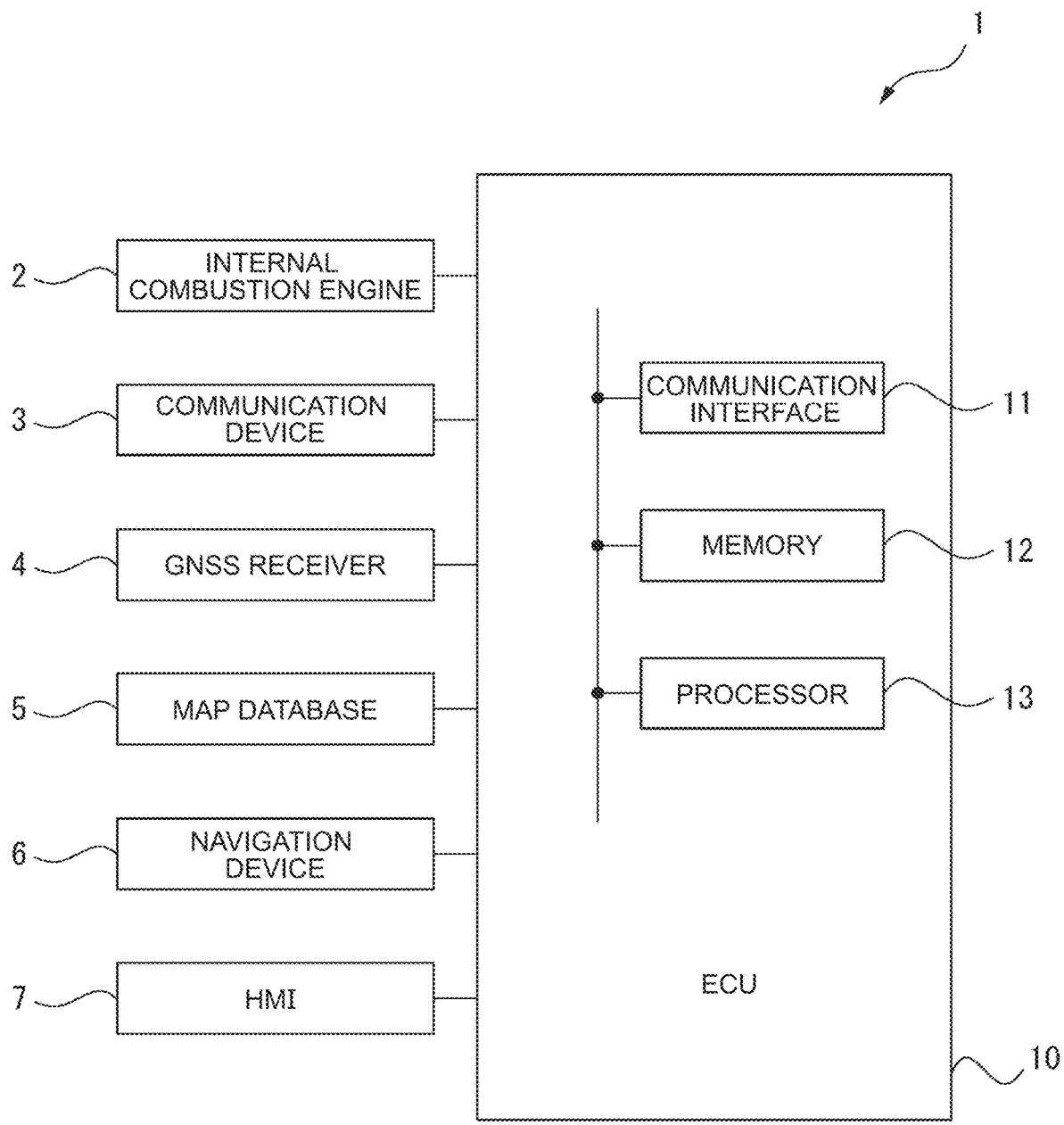
FIG. 1 is a diagram schematically showing a configuration of a vehicle provided with a vehicle transport planning device according to a first embodiment of the present disclosure.

First, a first embodiment of the present disclosure will be described with reference to FIGS. 1 to 9. FIG. 1 is a diagram schematically showing a configuration of a vehicle 1 provided with a vehicle transport planning device according to the first embodiment of the present disclosure. The vehicle 1 includes an internal combustion engine 2, a communication device 3, a global navigation satellite system (GNSS) receiver 4, a map database 5, a navigation device 6, a human machine interface (HMI) 7, and an electronic control unit (ECU) 10. The internal combustion engine 2, the communication device 3, the GNSS receiver 4, the map database 5, the navigation device 6, and the HMI 7 are connected to the ECU 10 via an in-vehicle network and the like conforming to standards such as a controller area network (CAN) so as to be able to communicate with the ECU 10.

The internal combustion engine 2 is, for example, a gasoline engine or a diesel engine, and outputs power by combusting an air-fuel mixture of fuel and air in a cylinder. The internal combustion engine 2 outputs driving force (power for traveling) of the vehicle 1 and functions as a drive source of the vehicle 1. The ECU 10 executes various controls for the internal combustion engine 2.

The communication device 3 can communicate with the outside of the vehicle 1 and enables communication between the vehicle 1 and the outside of the vehicle 1. For example, the communication device 3 includes a wide area communication device (for example, a data communication module (DCM)) that enables wide area communication between the vehicle 1 and the outside of the vehicle 1. The ECU 10 communicates with the outside of the vehicle 1 using the communication device 3.

The GNSS receiver 4 detects the current position of the vehicle 1 (for example, the latitude and longitude of the vehicle 1) based on positioning information obtained from multiple (for example, three or more) positioning satellites. Specifically, the GNSS receiver 4 acquires multiple positioning satellites and receives radio waves transmitted from the positioning satellites. Then, the GNSS receiver 4 calculates the distance to the positioning satellite based on the difference between the transmission time and the reception time of the radio waves, and detects the current position of the vehicle 1 based on the distance to the positioning satellite and the position (trajectory information) of the positioning satellite. The output of the GNSS receiver 4, that is, the current position of the vehicle 1 detected by the GNSS receiver 4 is transmitted to the ECU 10.

The map database 5 stores map information. The ECU 10 acquires the map information from the map database 5. A map database may be provided outside the vehicle 1 (for example, a server or the like), and the ECU 10 may acquire the map information from the outside of the vehicle 1.

The navigation device 6 sets a travel route of the vehicle 1 to a destination based on the current position of the vehicle 1 detected by the GNSS receiver 4, the map information in the map database 5, the input or the like by an occupant (for example, a driver) of the vehicle 1. The travel route set by the navigation device 6 is transmitted to the ECU 10.

The HMI 7 exchanges information between the vehicle 1 and the occupant (for example, the driver) of the vehicle 1. The HMI 7 includes an output unit (for example, a display, a speaker, and a vibration unit) that outputs information to the occupant of the vehicle 1, and an input unit (for example, a touch panel, an operation button, an operation switch, and a microphone) to which information is input by the occupant of the vehicle 1. The output of the ECU 10 is notified to the occupant of the vehicle 1 via the HMI 7, and the input by the occupant of the vehicle 1 is transmitted to the ECU 10 via the HMI 7. The HMI 7 is an example of an input device, an output device or an input and output device. A mobile terminal (a smartphone, a tablet terminal, etc.) of the occupant of the vehicle 1 may be connected to the ECU 10 by wire or wirelessly so as to be able to communicate with the ECU 10, and may function as the HMI 7. Further, the HMI 7 may be integrated with the navigation device 6.

The ECU 10 executes various controls of the vehicle 1. As shown in FIG. 1, the ECU 10 includes a communication interface 11, a memory 12 and a processor 13. The communication interface 11 and the memory 12 are connected to the processor 13 via a signal line. Although one ECU 10 is provided in the present embodiment, each of multiple ECUs may be provided for each function.

The communication interface 11 has an interface circuit for connecting the ECU 10 to the in-vehicle network. The ECU 10 is connected to other on-board devices via the communication interface 11. The communication interface 11 is an example of a communication unit of the ECU 10.

The memory 12 has, for example, a volatile semiconductor memory and a non-volatile semiconductor memory. The memory 12 stores a computer program, data, etc. used when the processor 13 executes various processes. The memory 12 is an example of a storage unit of the ECU 10.

The processor 13 has one or more central processing units (CPUs) and peripheral circuits thereof. The processor 13 may further have an arithmetic circuit such as a logic operation unit or a numerical operation unit.

By the way, in order to reduce air pollution, an area (hereinafter also referred to as an "engine restricted area") has been set where driving of an internal combustion engine mounted on a vehicle is prohibited or restricted in a place such as an urban area with heavy traffic. The engine restricted area is a range surrounded by a predetermined boundary, and examples of the engine restricted area include a low emission zone (LEZ), an ultra low emission zone (ULEZ), and a zero emission zone (ZEZ).

In principle, only vehicles that can travel without driving the internal combustion engine (for example, a plug-in hybrid electric vehicle (PHEV), a battery electric vehicle (BEV), or a fuel cell electric vehicle (FCEV)) are permitted to pass through the engine restricted area. When the internal combustion engine is driven in the engine restricted area, a fine or the like is imposed on the occupant of the vehicle.

However, it is strongly desired that the vehicle 1 move in the engine restricted area when a destination is set in the engine restricted area, even when only the internal combustion engine 2 is mounted as the drive source as in the vehicle 1. Therefore, in the present embodiment, the vehicle 1 is transported by the vehicle transport device according to the desire of the occupant of the vehicle 1, so that the vehicle 1 can move in the engine restricted area.

Figure 2:
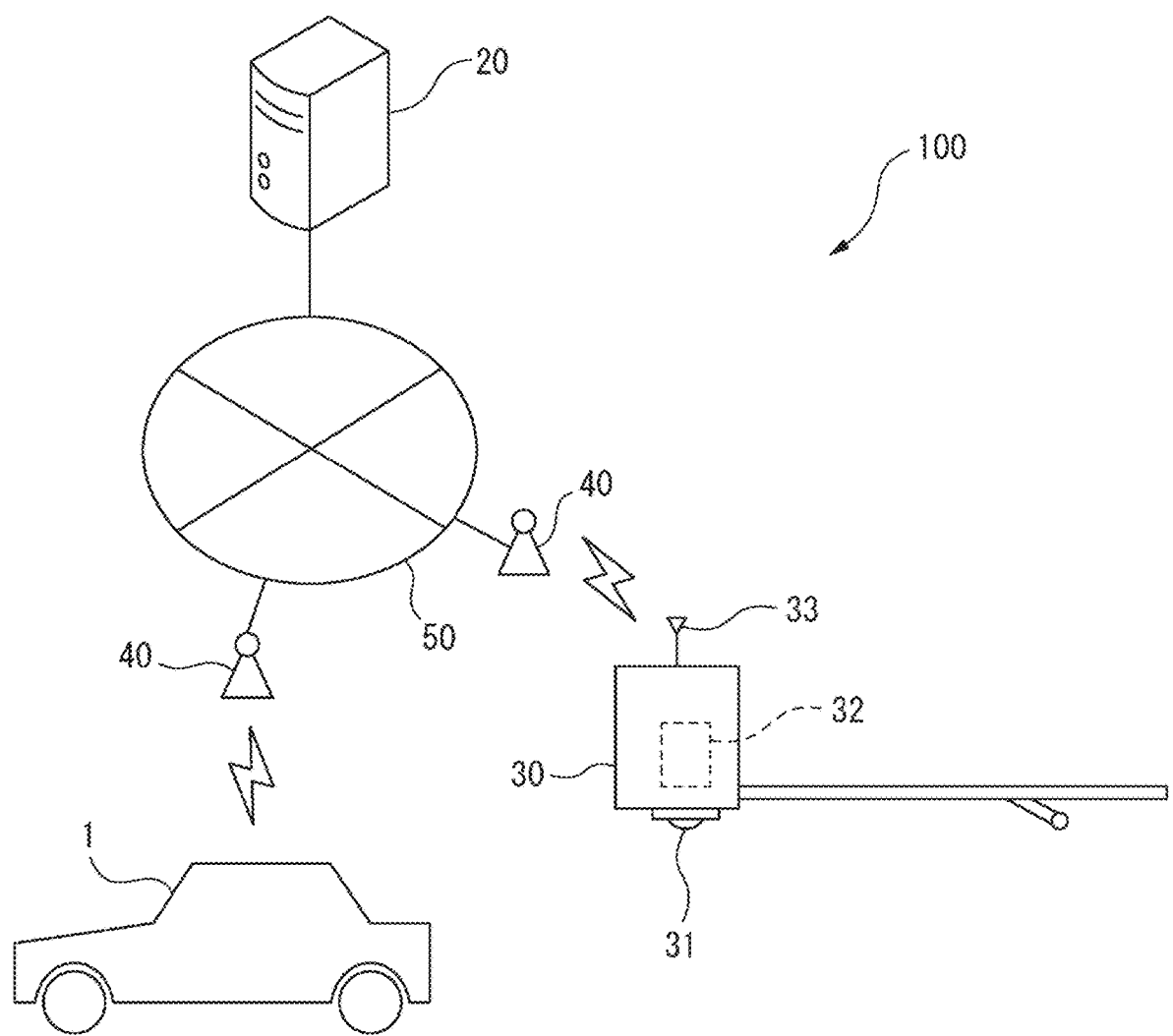
FIG. 2 is a diagram schematically showing a vehicle transport system that realizes transport of the vehicle.

FIG. 2 is a diagram schematically showing a vehicle transport system 100 that realizes transport of the vehicle 1. The vehicle transport system 100 includes a management server 20 and at least one vehicle transport device 30. The management server 20 can communicate with the vehicle transport device 30 and the vehicle 1 via a radio base station 40 such as a macro cell or a small cell and a communication network 50 such as an Internet network or a carrier network.

The vehicle transport device 30 is a self-propelled vehicle transport device, and has a known configuration (see, for example, U.S. Pat. No. 10,590,669 and Japanese Unexamined Patent Application Publication No. 2018-204373 (JP 2018-204373 A)) for transporting the vehicle 1 by autonomous travel. For example, the vehicle transport device 30 crawls into the space between the bottom of the vehicle 1 and a road surface from the front or rear of the vehicle 1 and lifts the four tires of the vehicle 1 to support and transport the vehicle 1.

As shown in FIG. 2, the vehicle transport device 30 includes a drive motor 32 that drives drive wheels 31, and the drive motor 32 outputs driving force (power for traveling) of the vehicle transport device 30. That is, the vehicle transport device 30 is an electrified vehicle, and can transport the vehicle 1 without driving the internal combustion engine. The vehicle transport device 30 also includes a communication module 33 capable of communicating with the radio base station 40 and communicates with the management server 20 using the communication module 33.

The vehicle transport device 30 transports the vehicle 1 according to a transport instruction from the management server 20. For example, the vehicle transport device 30 moves from a predetermined waiting location to a location near the boundary of the engine restricted area, and transports the vehicle 1 from the location near the boundary of the engine restricted area to the destination inside the engine restricted area. The waiting location of the vehicle transport device 30 is provided, for example, inside or outside the engine restricted area near the boundary of the engine restricted area. The waiting location of the vehicle transport device 30 may be provided at multiple points. Further, the waiting location of the vehicle transport device 30 may be configured to accommodate multiple vehicle transport devices 30.

Figure 3:
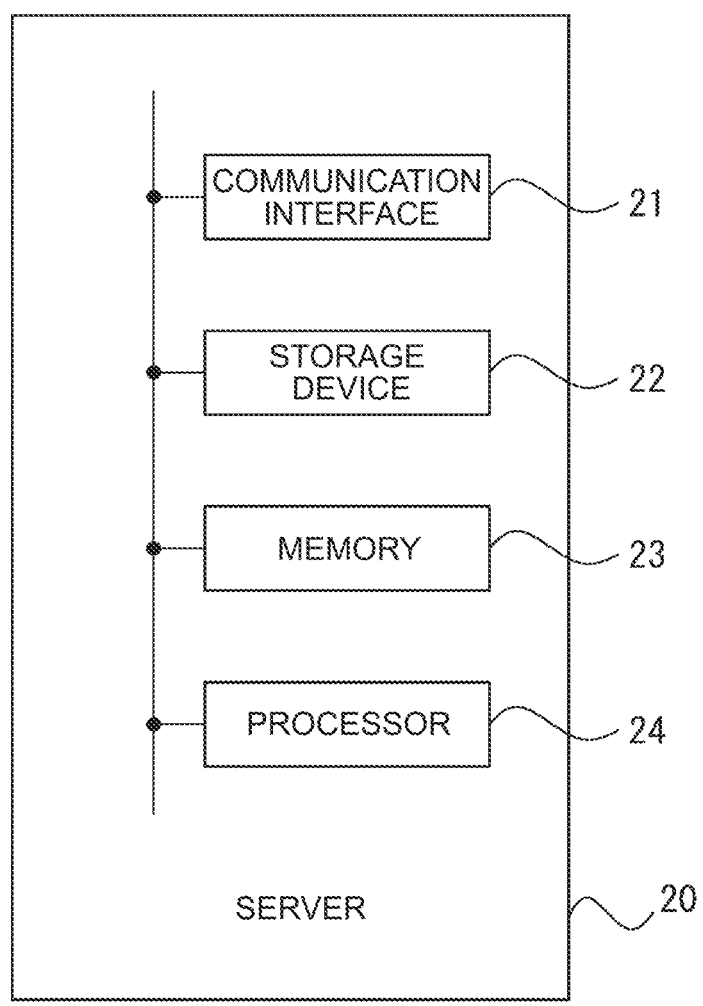
FIG. 3 is a diagram schematically showing a configuration of a management server.

The management server 20 manages transport of the vehicle 1 using the vehicle transport device 30. FIG. 3 is a diagram schematically showing a configuration of the management server 20. The management server 20 includes a communication interface 21, a storage device 22, a memory 23, and a processor 24. The communication interface 21, the storage device 22, and the memory 23 are connected to the processor 24 via a signal line. The management server 20 may further include an input device such as a keyboard and a mouse, an output device such as a display, and the like. Further, the management server 20 may be composed of multiple computers.

The communication interface 21 has an interface circuit for connecting the management server 20 to the communication network 50. The management server 20 communicates with the vehicle 1 and the vehicle transport device 30 via the communication network 50. The communication interface 21 is an example of a communication unit of the management server 20.

The storage device 22 includes, for example, a hard disk drive (HDD), a solid state drive (SDD) or an optical recording medium, and an access device thereof. The storage device 22 stores various data, and stores, for example, information (identification information, position information, etc.) of the vehicle transport device 30, a computer program for the processor 24 to execute various processes, and the like. The storage device 22 is an example of a storage unit of the management server 20.

The memory 23 has a non-volatile semiconductor memory (for example, a random access memory (RAM)). The memory 23 temporarily stores various data and the like used when various processes are executed by the processor 24, for example. The memory 23 is another example of the storage unit of the management server 20.

The processor 24 has one or more CPUs and peripheral circuits thereof, and executes various processes. The processor 24 may further include other arithmetic circuits such as a logical operation unit, a numerical operation unit, or a graphic processing unit. The processor 24 is an example of a control unit of the management server 20.

Figure 4:
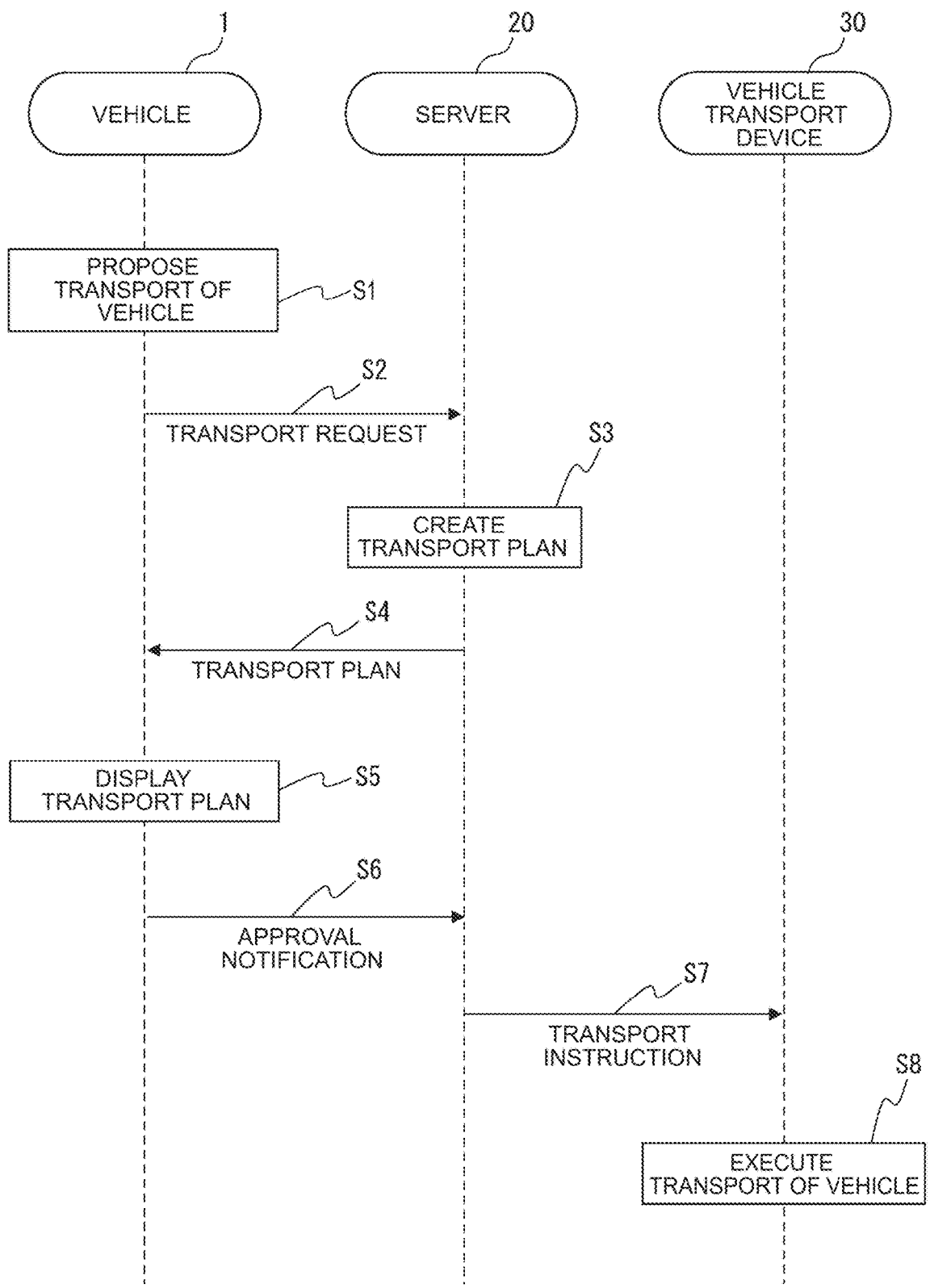
FIG. 4 is a sequence diagram schematically showing a series of a flow when the vehicle is transported using a vehicle transport device.

FIG. 4 is a sequence diagram schematically showing a series of a flow when the vehicle 1 is transported using the vehicle transport device 30. In this sequence diagram, communication between the vehicle 1 and the management server 20 and communication between the vehicle transport device 30 and the management server 20 are performed via the radio base station 40 and the communication network 50.

When the vehicle 1 is predicted to enter the engine restricted area, transport of the vehicle 1 is proposed to the occupant of the vehicle 1 in the vehicle 1 (step S1). When the occupant of the vehicle 1 desires the transport of the vehicle 1, a transport request is transmitted from the vehicle 1 to the management server 20 (step S2).

When the transport request is transmitted from the vehicle 1 to the management server 20, the management server 20 creates a transport plan (step S3). The transport plan includes, for example, a pick-up point, a pick-up time, and the like. The pick-up point means a point at which the vehicle 1 is loaded onto the vehicle transport device 30, that is, a starting point of the transport of the vehicle. The pick-up time means an estimated arrival time of the vehicle transport device 30 at the pick-up point. When the vehicle transport system 100 includes multiple vehicle transport devices 30, the management server 20 selects one vehicle transport device 30 for transporting the vehicle 1 from among the multiple vehicle transport devices 30 when creating the transport plan.

The transport plan created by the management server 20 is transmitted from the management server 20 to the vehicle 1 (step S4). The vehicle 1 displays the transport plan transmitted from the management server 20 to the occupant of the vehicle 1 via the HMI 7 (step S5). When the occupant of the vehicle 1 approves the transport plan, the vehicle 1 transmits approval notification to the management server 20 (step S6).

When the management server 20 receives the approval notification from the vehicle 1, the transport instruction is transmitted to the vehicle transport device 30 (step S7). The transport instruction includes, for example, the pick-up point, the pick-up time, a movement start time to the pick-up point, a travel route from the current position (for example, the waiting location) of the vehicle transport device 30 to the pick-up point, and the like.

Upon receiving the transport instruction from the management server 20, the vehicle transport device 30 executes the transport of the vehicle 1 based on the transport instruction (step S8).

Figure 5:
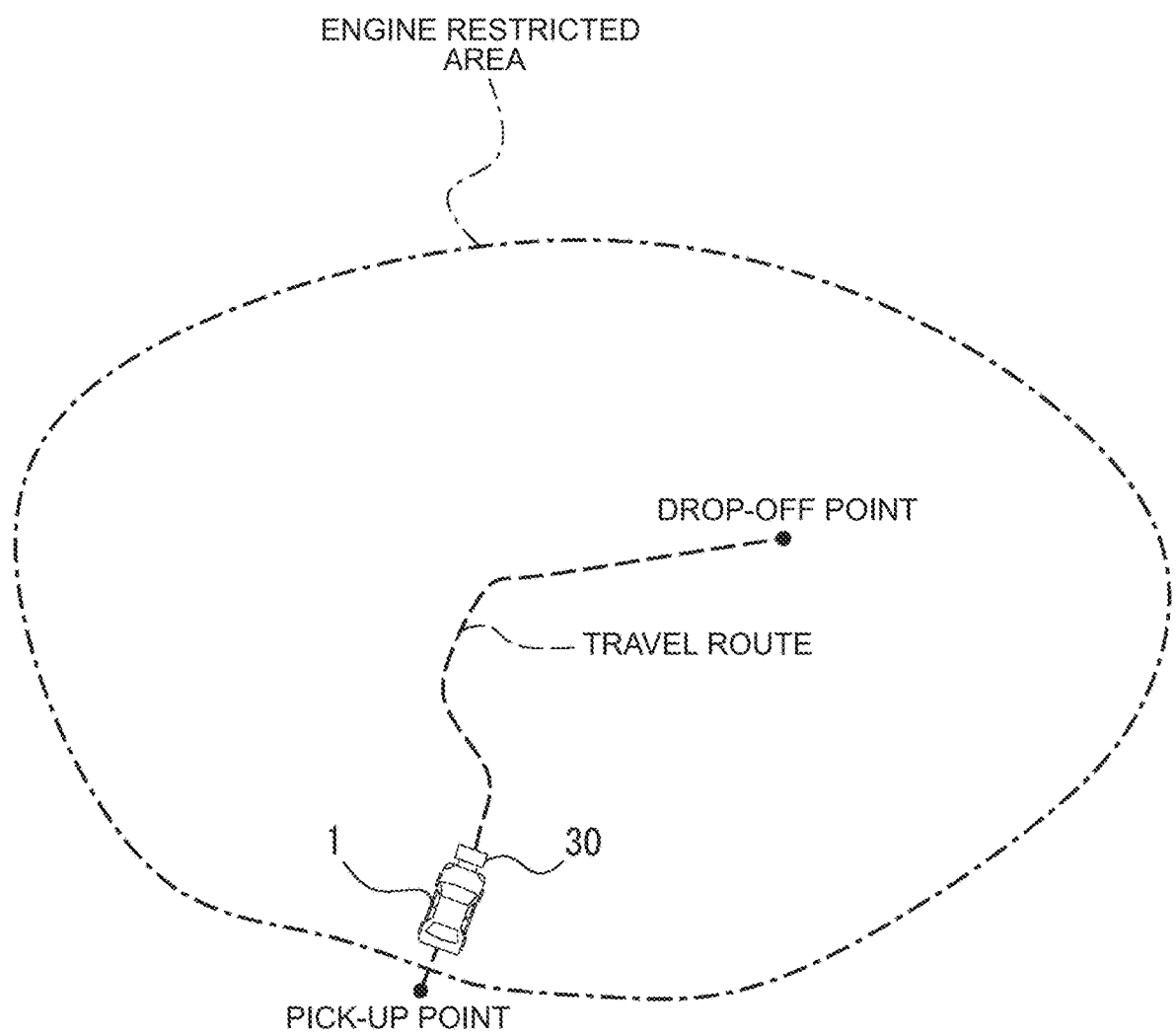
FIG. 5 is a diagram showing an example of a travel route when the vehicle transport device transports the vehicle.

FIG. 5 is a diagram showing an example of the travel route (transport route) when the vehicle transport device 30 transports the vehicle 1. In the example of FIG. 5, the pick-up point is set outside the boundary of the engine restricted area, and a drop-off point is set inside the engine restricted area. The drop-off point means a point at which the vehicle 1 is unloaded from the vehicle transport device 30, that is, an end point of the transport of the vehicle. The drop-off point is set by the occupant of the vehicle 1 when the transport of the vehicle 1 is started via the HMI 7 and the mobile terminal of the occupant of the vehicle 1, for example. Further, the travel route from the pick-up point to the drop-off point is set by the vehicle transport device 30 or the management server 20.

While the vehicle 1 is transported by the vehicle transport device 30, the internal combustion engine 2 of the vehicle 1 is stopped. Therefore, the vehicle 1 is transported along the travel route shown in FIG. 5, so that the occupant of the vehicle 1 can move to a desired destination in the engine restricted area while remaining in the vehicle 1. When there is a destination beyond the engine restricted area, the drop-off point may be set near the boundary of the engine restricted area, and the travel route of the vehicle transport device 30 may be set to cross the engine restricted area.

Figure 6:
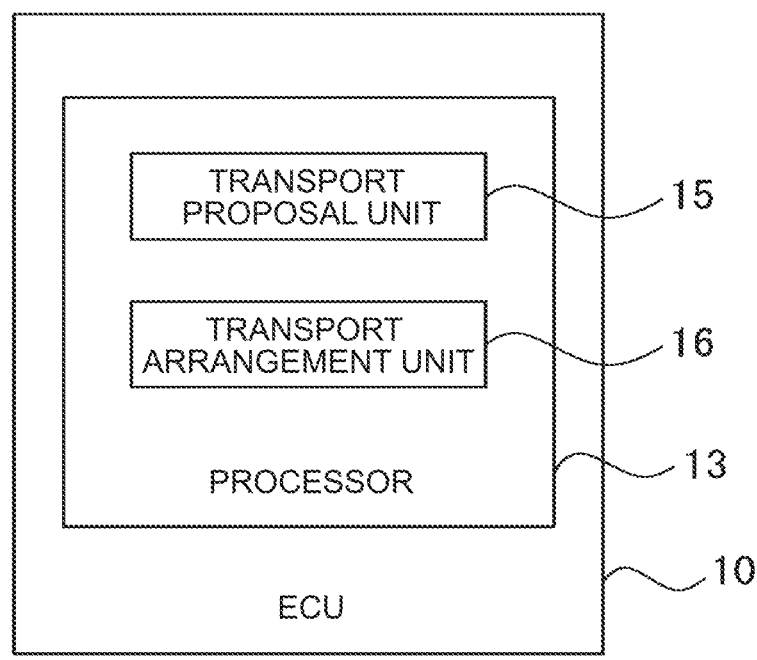
FIG. 6 is a functional block diagram of a processor of an electronic control unit (ECU)

In the present embodiment, the ECU 10 of the vehicle 1 functions as the vehicle transport planning device, and the ECU 10 of the vehicle 1 makes a proposal for transporting the vehicle as described above. FIG. 6 is a functional block diagram of the processor 13 of the ECU 10. In the present embodiment, the processor 13 includes a transport proposal unit 15 and a transport arrangement unit 16. Each of the transport proposal unit 15 and the transport arrangement unit 16 is a functional module realized by the processor 13 of the ECU 10 executing a computer program stored in the memory 12 of the ECU 10. Each of the transport proposal unit 15 and the transport arrangement unit 16 may be realized by a dedicated arithmetic circuit provided in the processor 13.

The transport proposal unit 15 proposes the transport of the vehicle 1 in the engine restricted area to the occupant of the vehicle 1. For example, the transport proposal unit 15 determines whether to propose the transport of the vehicle 1 based on the travel route of the vehicle 1, the travel route being preset in the vehicle 1. As a result, it is possible to confirm with the occupant of the vehicle 1 whether the vehicle needs to be transported before the vehicle 1 approaches the engine restricted area, so that the vehicle can be transported smoothly. For example, the transport proposal unit 15 proposes the transport of the vehicle 1 when the travel route of the vehicle 1 includes the engine restricted area, and does not propose the transport of the vehicle 1 when the travel route of the vehicle 1 does not include the engine restricted area.

On the other hand, even when the travel route of the vehicle 1 is not set, there is a high possibility that the occupant of the vehicle 1 desires the transport of the vehicle when the vehicle 1 is traveling near the engine restricted area. Therefore, the transport proposal unit 15 may propose the transport of the vehicle 1 when the distance from the current position of the vehicle 1 to the boundary of the engine restricted area has decreased to a predetermined distance. As a result, even when the travel route of the vehicle 1 is not set, it is possible to propose the transport of the vehicle at an appropriate timing.

When the occupant of the vehicle 1 approves the proposal for transporting the vehicle, that is, when the occupant of the vehicle 1 desires the transport of the vehicle 1, the transport arrangement unit 16 requests arrangement of the vehicle transport device 30 for transporting the vehicle 1. As a result, the management server 20 instructs the vehicle transport device 30 to transport the vehicle 1, and the vehicle transport device 30 transports the vehicle 1 by autonomous travel in the engine restricted area. Therefore, it is possible to move the vehicle 1 equipped with the internal combustion engine 2 in the engine restricted area.

Figure 7:
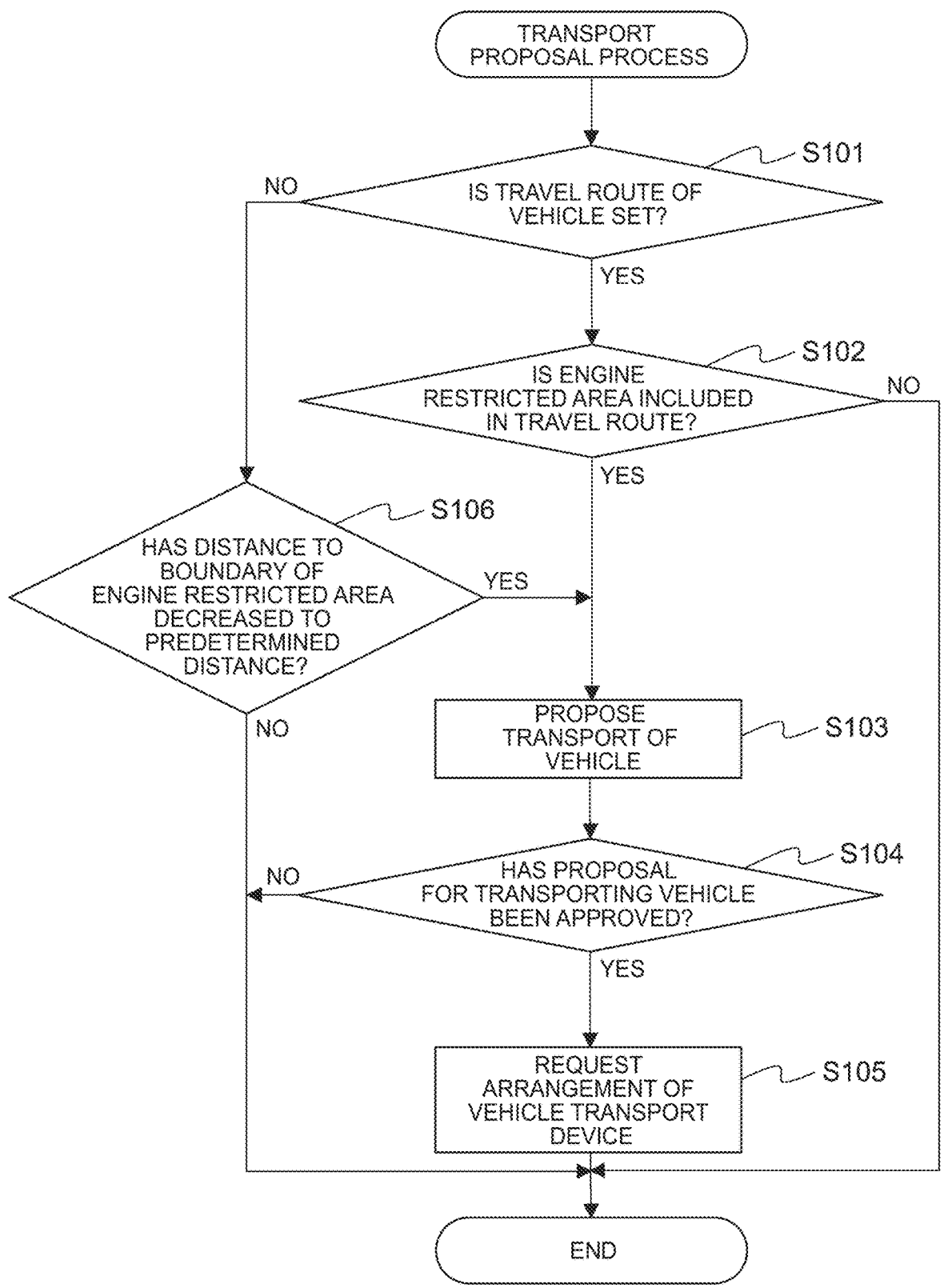
FIG. 7 is a flowchart showing a control routine for a transport proposal process in the first embodiment.
Figure 8:
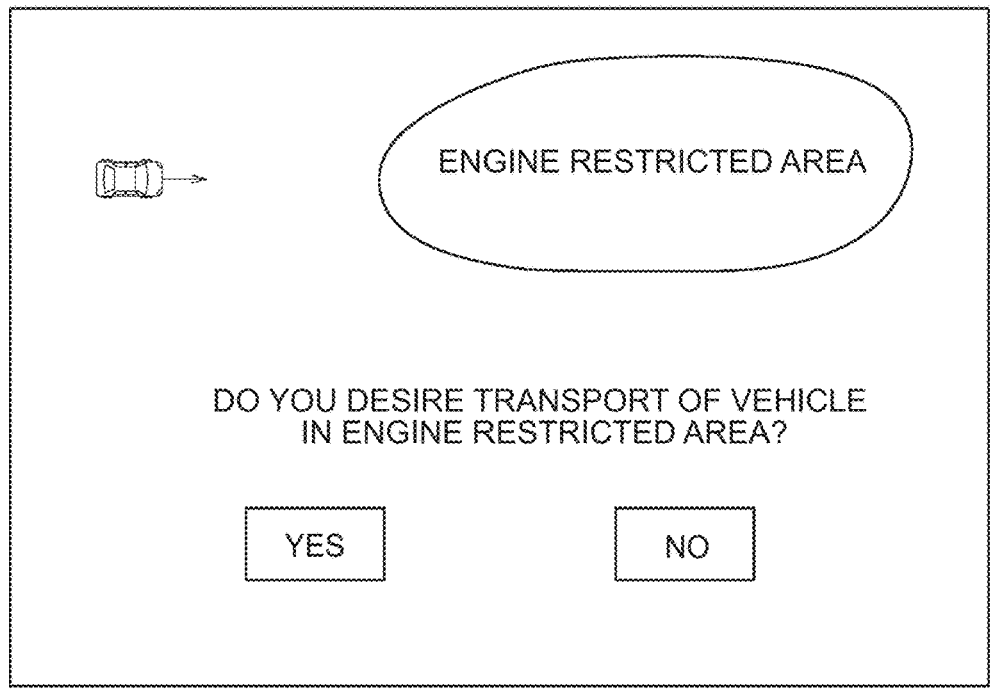
FIG. 8 is a diagram showing an example of a proposal screen for proposing the transport of the vehicle to an occupant of the vehicle.

Hereinafter, with reference to FIG. 7, a detailed description of a control flow when arrangement of the transport of the vehicle is requested from the vehicle 1 will be given. FIG. 7 is a flowchart showing a control routine for a transport proposal process in the first embodiment. The control routine is executed by the processor 13 of the ECU 10 according to a computer program stored in the memory 12 of the ECU 10.

First, in step S101, the transport proposal unit 15 determines whether a travel route of the vehicle 1 is set. When it is determined that the travel route of the vehicle 1 is set, the control routine proceeds to step S102.

In step S102, the transport proposal unit 15 determines whether the travel route of the vehicle 1 includes the engine restricted area. For example, the position information of the engine restricted area is stored in the map information of the map database 5, and the transport proposal unit 15 collates the travel route of the vehicle 1 with the range of the engine restricted area to make this determination. When it is determined in step S102 that the travel route of the vehicle 1 does not include the engine restricted area, the control routine ends. On the other hand, when it is determined in step S102 that the travel route of the vehicle 1 includes the engine restricted area, the control routine proceeds to step S103.

In step S103, the transport proposal unit 15 proposes the transport of the vehicle 1 in the engine restricted area to the occupant of the vehicle 1 via the HMI 7. For example, the transport proposal unit 15 displays a proposal screen shown in FIG. 8 on a display of the HMI 7. In the example of this proposal screen, the positional relationship between the current position of the vehicle 1 and the engine restricted area is visually shown, and the occupant of the vehicle 1 selects whether the transport of the vehicle is necessary on the proposal screen.

Next, in step S104, the transport arrangement unit 16 determines whether the occupant of the vehicle 1 has approved the proposal for transporting the vehicle, that is, whether the occupant of the vehicle 1 desires the transport the vehicle 1. When it is determined that the proposal for transporting the vehicle has been rejected by the occupant of the vehicle 1, the control routine ends. On the other hand, when it is determined that the occupant of the vehicle 1 has approved the proposal for transporting the vehicle, this control routine proceeds to step S105.

In step S105, the transport arrangement unit 16 requests the management server 20 to arrange the vehicle transport device 30 for transporting the vehicle 1. Specifically, the transport arrangement unit 16 transmits the transport request to the management server 20 via the communication network 50. The transport request includes, for example, the current position of the vehicle 1, identification information of the vehicle 1 (for example, a license plate number, a vehicle type, a color, etc.). After step S105, the control routine ends.

On the other hand, when it is determined in step S101 that the travel route of the vehicle 1 is not set, the control routine proceeds to step S106. In step S106, the transport proposal unit 15 determines whether the distance from the current position of the vehicle 1 to the boundary of the engine restricted area has decreased to a predetermined distance. For example, the position information of the engine restricted area is stored in the map information of the map database 5, and the transport proposal unit 15 calculates the distance from the current position of the vehicle 1 detected by the GNSS receiver 4 to the boundary of the engine restricted area to make this determination.

When it is determined in step S106 that the distance from the current position of the vehicle 1 to the boundary of the engine restricted area has not decreased to the predetermined distance, the control routine ends. When it is determined in step S106 that the distance from the current position of the vehicle 1 to the boundary of the engine restricted area has decreased to the predetermined distance, the control routine proceeds to step S103. In this case, as described above, steps S103 to S105 are executed, and the arrangement of the vehicle transport device 30 is requested according to the desire of the occupant of the vehicle 1.

In step S102, the transport proposal unit 15 may determine whether the distance from the travel route of the vehicle 1 to the boundary of the engine restricted area is equal to or less than the predetermined distance. That is, the transport proposal unit 15 may propose the transport of the vehicle 1 when the distance from the travel route of the vehicle 1 to the boundary of the engine restricted area is equal to or less than the predetermined distance.

Further, in step S106, the transport proposal unit 15 may determine whether the vehicle 1 has passed through a predetermined position around the engine restricted area. That is, the transport proposal unit 15 may propose the transport of the vehicle 1 when the vehicle 1 passes through the predetermined position around the engine restricted area. In this case, the predetermined position is set, for example, on a road leading to the engine restricted area.

Further, the transport arrangement unit 16 may transmit preference information of the occupant of the vehicle 1 regarding travel of the vehicle transport device 30 to the management server 20 when requesting the arrangement of the vehicle transport device 30. As a result, the preference of the occupant of the vehicle 1 can be reflected in the traveling state when the vehicle 1 is transported by the vehicle transport device 30, and the degree of satisfaction in the transport of the vehicle can be further enhanced.

Figure 9:
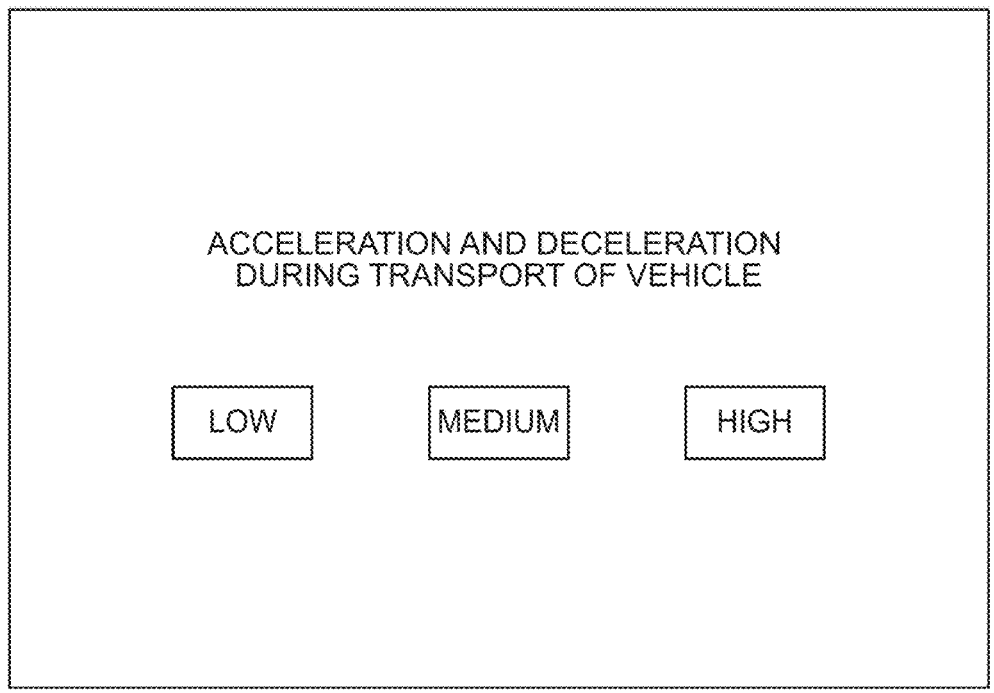
FIG. 9 is a diagram showing an example of a setting screen for setting a preference of the occupant of the vehicle.

In this case, for example, after the occupant of the vehicle 1 approves the proposal for transporting the vehicle, the transport arrangement unit 16 displays a setting screen shown in FIG. 9 on the display of the HMI 7. In the example of this setting screen, the setting of acceleration and deceleration during the transport of the vehicle is shown in three stages (low, medium, and high in order from the lowest to the highest), and the occupant of the vehicle 1 selects the setting of the desired acceleration and deceleration during the transport of the vehicle on the setting screen. For example, the upper limit value of the acceleration and deceleration corresponding to the setting of each of the three stages is preset, and the upper limit value of the acceleration and deceleration corresponding to the selected setting is transmitted from the management server 20 to the vehicle transport device 30 as a transport instruction. In this case, the vehicle transport device 30 transports the vehicle 1 such that the upper limit value of the acceleration and deceleration of the vehicle transport device 30 does not reach the set value.

In the setting screen, either ride comfort or a transport speed may be selected by the occupant of the vehicle 1 as a priority when the vehicle is transported. In this case, when the ride comfort is selected as a priority, the acceleration and deceleration or a speed during the transport of the vehicle is reduced as compared with a case when the transport speed is selected as a priority.

Second Embodiment

A vehicle transport planning device and a vehicle transport system according to a second embodiment are basically the same as the vehicle transport planning device and the vehicle transport system according to the first embodiment, except for the points described below. Therefore, hereinafter, the second embodiment of the present disclosure will be described focusing on the parts different from the first embodiment.

Figure 10:
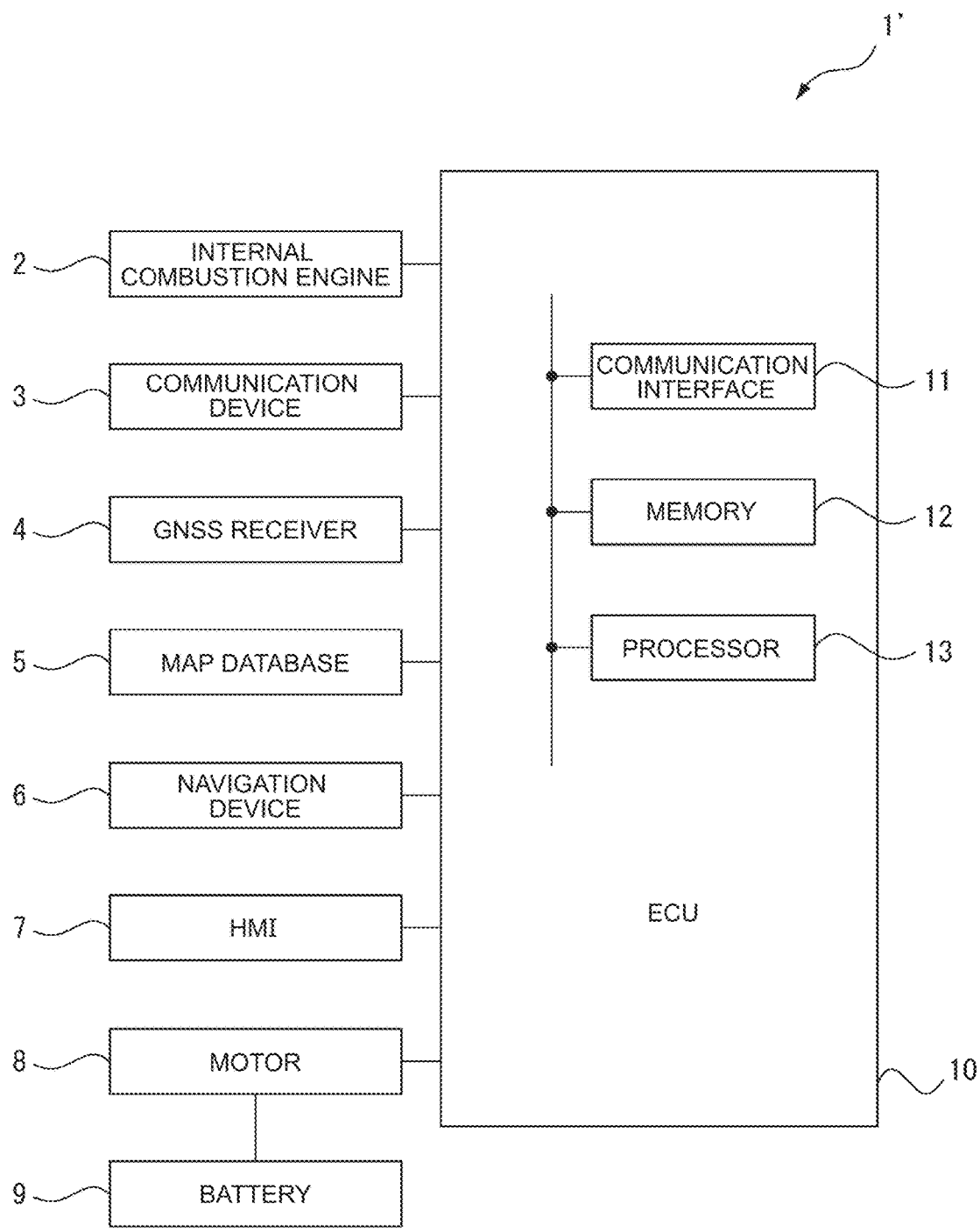
FIG. 10 is a diagram schematically showing a configuration of a vehicle provided with a vehicle transport planning device according to a second embodiment of the present disclosure.

FIG. 10 is a diagram schematically showing a configuration of a vehicle 1' provided with the vehicle transport planning device according to the second embodiment of the present disclosure. The vehicle 1' includes a motor 8 and a battery 9, in addition to the internal combustion engine 2, the communication device 3, the GNSS receiver 4, the map database 5, the navigation device 6, and the HMI 7. The motor 8 is connected to the ECU 10 via the in-vehicle network and the like conforming to standards such as CAN so as to be able to communicate with the ECU 10.

The motor 8 is rotationally driven by electric power supplied from the battery 9, and outputs driving force (power for traveling) of the vehicle 1. That is, in the second embodiment, the internal combustion engine 2 and the motor 8 function as a drive source for the vehicle 1'. The ECU 10 controls the motor 8 via an inverter or the like.

In addition, the vehicle 1' is provided with a charging port, and the battery 9 can be charged by external power supply. Accordingly, the vehicle 1' is a so-called plug-in hybrid electric vehicle (PHEV).

When the vehicle 1' is a plug-in hybrid electric vehicle, and the state of charge (SOC) of the battery 9 is sufficient, the vehicle 1' stops the internal combustion engine 2 and can travel in the engine restricted area only with the output of the motor 8. Therefore, when the SOC of the battery 9 is high, it is less necessary to propose the transport of the vehicle 1' in the engine restricted area than when the SOC of the battery 9 is low. As a result, in the present embodiment, the transport proposal unit 15 determines whether to propose the transport of the vehicle 1' to the occupant of the vehicle 1' based on the SOC of the battery 9. For example, the transport proposal unit 15 proposes the transport of the vehicle 1' when the SOC of the battery 9 is less than a predetermined value, and does not propose the transport of the vehicle 1' when the SOC of the battery 9 is equal to or higher than the predetermined value. As a result, the transport of the vehicle 1' can be proposed at a more accurate timing, and unnecessary transport of the vehicle can be suppressed.

FIG. 11 is a flowchart showing a control routine for a transport proposal process in the second embodiment. The control routine is executed by the processor 13 of the ECU 10 according to a computer program stored in the memory 12 of the ECU 10.

Steps S201 and S202 are executed in the same manner as steps S101 and S102 in FIG. 7, and when it is determined in step S202 that a travel route of the vehicle 1' includes an engine restricted area, the control routine proceeds to step S203.

In step S203, the transport proposal unit 15 determines whether the SOC of the battery 9 is equal to or higher than the predetermined value. The transport proposal unit 15 calculates the SOC of the battery 9 by a known method, and calculates the SOC of the battery 9 based on a voltage and a temperature of the battery 9 detected by a sensor provided in the battery 9, for example. The transport proposal unit 15 may calculate the SOC of the battery 9 by integrating the input and output current of the battery 9 detected by the sensor provided in the battery 9. The predetermined value used for determination in step S203 is, for example, 40% to 80%, and may be changed according to the area dimension or the like of the engine restricted area. For example, the larger the area dimension of the engine restricted area is, the higher the predetermined value may be.

When it is determined in step S203 that the SOC of the battery 9 is equal to or higher than the predetermined value, the control routine ends. On the other hand, when it is determined in step S203 that the SOC of the battery 9 is less than the predetermined value, the control routine proceeds to step S204. In this case, steps S204 to S206 are executed in the same manner as steps S103 to S105 in FIG. 7, and the arrangement of the vehicle transport device 30 is requested according to the desire of the occupant of the vehicle 1'.

On the other hand, when it is determined in step S201 that the travel route of the vehicle 1' is not set, the control routine proceeds to step S207. Step S207 is executed in the same manner as step S106 in FIG. 7, and when it is determined in step S207 that the distance from the current position of the vehicle 1' to the boundary of the engine restricted area has decreased to a predetermined distance, the control routine proceeds to step S203, and steps S203 to S206 are executed as described above.

Note that the control routine in FIG. 11 can be modified in the same manner as the control routine in FIG. 7.

Other Embodiments

Although the preferred embodiments of the present disclosure have been described above, the present disclosure is not limited to these embodiments, and various modifications and changes can be made within the scope of the claims. For example, the vehicle 1 may be a hybrid electric vehicle (HEV) or a plug-in hybrid electric vehicle (PHEV).

Alternatively, the vehicle transport device 30 may be manually operated by an operator. That is, the vehicle transport device 30 may transport the vehicles 1 and 1' by manual operation by the operator based on a transport instruction from the management server 20.

Further, a computer program that causes a computer to implement the functions of the units of the processor 13 of the ECU 10 may be provided so as to be stored in a computer-readable recording medium. The computer-readable recording medium is, for example, a magnetic recording medium, an optical recording medium, or a semiconductor memory.

What is claimed is:
1. A system, comprising:
an engine-equipped vehicle including
an internal combustion engine,
a processor that
proposes, to an occupant of the engine-equipped vehicle, transport of the engine-equipped vehicle in a predetermined area where driving of the internal combustion engine is prohibited or restricted, and
in response to the occupant requesting the transport of the engine-equipped vehicle, requests arrangement for transporting the engine-equipped vehicle, and
a human machine interface to communicate with the processor;
an electric vehicle including
a drive motor to drive a drive wheel of the electric vehicle, and
a component to be positioned into a space between a bottom of the engine-equipped vehicle and a road surface, and to lift the engine-equipped vehicle; and
a management server to communicate with the engine-equipped vehicle and the electric vehicle, wherein:
the processor outputs a notification, to the human machine interface, for proposing the transport of the engine-equipped vehicle in the predetermined area, and in response to an acceptance of the notification, transmits a first signal, to the management server, for requesting the arrangement for transporting the engine-equipped vehicle,
the management server, in response to receiving the first signal, transmits a second signal, to the electric vehicle, for a transport instruction, and
the electric vehicle, in response to the second signal from the management server, transports the engine-equipped vehicle.

2. The system according to claim 1, wherein
the processor determines whether to output the notification based on a travel route of the engine-equipped vehicle, the travel route being preset in the engine-equipped vehicle.

3. The system according to claim 1, wherein
the processor, in response to a distance from a current position of the engine-equipped vehicle to a boundary of the predetermined area having decreased to a predetermined distance, outputs the notification.

4. The system according to claim 1, wherein
the processor, in response to the engine-equipped vehicle passing through a predetermined position around the predetermined area, outputs the notification.

5. The system according to claim 1, wherein:
the engine-equipped vehicle is a plug-in hybrid electric vehicle equipped with a battery; and
the processor determines whether to output the notification based on a state of charge of the battery.

6. The system according to claim 1, wherein
the processor transmits preference information of the occupant regarding travel of the electric vehicle to the management server, when the processor transmits the first signal for the transport request to the management server.

7. The system according to claim 1, wherein
the electric vehicle, in response to the second signal from the management server, autonomously travels for transporting the engine-equipped vehicle.

8. The system according to claim 7, wherein
the engine-equipped vehicle is a plug-in hybrid electric vehicle equipped with a battery, and
the processor
determines whether a state of charge of the battery is less than a predetermined value, and
in response to determining that the state of charge of the battery being less than the predetermined value, outputs the notification to the human machine interface.

9. The system according to claim 8, wherein
the predetermined value increases as the predetermined area increases.

10. The system according to claim 7, wherein
the processor
determines whether a travel route of the engine-equipped vehicle overlaps the predetermined area, and
in response to determining that the travel route of the engine-equipped vehicle overlaps the predetermined area, outputs the notification.

11. The system according to claim 7, wherein
the processor determines whether a distance between a current position of the engine-equipped vehicle and a boundary of the predetermined area is equal to or less than a predetermined distance, and in response to determining that the distance is equal to or less than the predetermined distance, outputs the notification.

12. The system according to claim 7, wherein the processor causes a display of the human machine interface to display a setting screen for setting of acceleration and deceleration during the transport of the engine-equipped vehicle in a plurality of stages, and the electric vehicle transports the engine-equipped vehicle such that the acceleration and deceleration during the transport of the engine-equipped vehicle does not reach an upper limit value of the acceleration and deceleration set by the occupant.

* * * * *